(12) United States Patent
Knapp et al.

(10) Patent No.: US 9,045,149 B2
(45) Date of Patent: Jun. 2, 2015

(54) MACHINERY FOUNDATION MODULE

(71) Applicants: Ryan W. Knapp, Sandy Hook, CT (US); Peter McGonagle, Southport, CT (US); Mark O'Donnell, Danbury, CT (US)

(72) Inventors: Ryan W. Knapp, Sandy Hook, CT (US); Peter McGonagle, Southport, CT (US); Mark O'Donnell, Danbury, CT (US)

(73) Assignee: THE MACTON CORPORATION, Oxford, CT (US)

( * ) Notice: Subject to any disclaimer, the term of this patent is extended or adjusted under 35 U.S.C. 154(b) by 112 days.

(21) Appl. No.: 13/826,001

(22) Filed: Mar. 14, 2013

(65) Prior Publication Data

US 2014/0261050 A1   Sep. 18, 2014

(51) Int. Cl.
| | |
|---|---|
| *B61J 1/00* | (2006.01) |
| *B61J 1/04* | (2006.01) |
| *B60S 13/02* | (2006.01) |
| *E02D 27/44* | (2006.01) |
| *F16M 9/00* | (2006.01) |

(52) U.S. Cl.
CPC .............. *B61J 1/04* (2013.01); *Y10T 29/49947* (2015.01); *B60S 13/02* (2013.01); *B61J 1/00* (2013.01); *E02D 27/44* (2013.01); *F16M 9/00* (2013.01)

(58) Field of Classification Search
CPC .................. B61J 1/00; B61J 1/02; B61J 1/10; B60S 13/00; B60S 13/02
USPC ......................................... 104/35, 36, 44–48
See application file for complete search history.

(56) References Cited

U.S. PATENT DOCUMENTS

| | | | | |
|---|---|---|---|---|
| 5,086,704 | A | * | 2/1992 | Mueller .......................... 104/44 |
| 5,755,160 | A | * | 5/1998 | Blufordcraving ............... 104/36 |
| 6,382,106 | B1 | * | 5/2002 | Knight ............................ 104/44 |
| 7,798,067 | B2 | | 9/2010 | Starnes |
| 7,966,939 | B2 | | 6/2011 | Holt |
| 2006/0230973 | A1 | * | 10/2006 | Nebeker et al. ................. 104/35 |
| 2007/0175353 | A1 | | 8/2007 | Jeffs |

* cited by examiner

*Primary Examiner* — R.J. McCarry, Jr.
(74) *Attorney, Agent, or Firm* — St. Onge Steward Johnston & Reens LLC

(57) ABSTRACT

A receiver embedded in and affixed to a foundation, the receiver is adapted to receive a turntable through an opening defined by the floor and walls of the receiver. The turntable is designed to rotate within the opening. The floor of the receiver has holes therein for bolts. The holes are located relative to center of the receiver and the foundation such that a turntable may be affixed to the bolts and rotate within the receiver and foundation. The receiver has a number of flanges both on the walls and on the floor to engage with the foundation. The foundation is created from two pour sections, a first pour for the floor of the foundation and a second pour for the walls of the foundation.

20 Claims, 5 Drawing Sheets

MACHINERY FOUNDATION MODULE

FIELD OF THE INVENTION

This invention relates to heavy lifting and positioning machinery and the manufacture thereof for installation at a site. More particularly, this invention relates to an improved turntable and method of installation thereof.

BACKGROUND OF THE INVENTION

Heavy machinery is found in many factories, rail yards, repair shops and other locations where large items need to be moved and positioned. For example, lifting machinery is necessary to repair rail cars, engines and other railway vehicles and machinery. The lifting machinery is often made up of large support structures using hydraulic pistons, screws or large motors to move machinery. Because of the size of the lifting machinery and the size of machinery to be moved, it is often advantageous to place the lifting machinery below ground level, typically in a foundation.

In the case of a rail car lifting or positioning machinery such as a repair stand or a turntable, it is desirable that the gap between the rails on the ground and the rails on the positioning machine be minimized. In the case of a turntable, the foundation must be sufficiently round so that the turntable can freely rotate without rubbing against the foundation. A difficulty associated with minimizing gaps and rubbing is that the machinery sits in a foundation that is manufactured using concrete forms. The concrete forms may be built from wooden boards and cut and designed on site. The machinery is often built from large steel plates and/or beams that are cut and fit at the point of manufacture. Because the foundation and the machinery are built separately, the foundation often needs modifications when the machinery is installed on site to adjust the tolerances and gaps for ideal operation of the machinery within the foundation.

Current practice uses a number of foundation embedments to create complicated sections of a foundation. In order to properly locate each embedment, a number of variables may need to be properly surveyed or measured to allow for correct installation. Variables include, for example, center, center line, perimeter and depth of the foundation. Locating center alone is often a surveying task that can take a substantial amount of time to complete. Once center is located, a number of holes must be drilled in a flat foundation so that anchor bolts can be installed. The anchor bolts affix the machinery to the foundation, and the pattern of the anchor bolts must be within tight tolerances so that the machinery can easily bolt to the foundation. Again, locating the center and setting the pattern of the bolts can be a lengthy and costly surveying task.

Often, a general contractor responsible for pouring concrete has difficulties achieving the tolerances required for a turntable to operate correctly within a foundation. Since the tolerance requirements are so high relative to what is often required of general contractors, locating center and bolt holes within a foundation is a time consuming and expensive process. Additional problems with tolerances of concrete pouring may require alterations to foundations after pouring, which are a time consuming and labor intensive.

Additionally, current practice for installation of a turntable may require that the turntable is installed in a partially completed foundation, and then the foundation is completed once the turntable is in place. Often, the first part of the foundation is poured, and then the general contractor leaves the job site because of the length of time required to install the turntable. Then the turntable is installed, and once installed, the general contractor is brought back to the job site to complete the foundation. This requires additional costs associated with re-mobilizing the general contractor's foundation pouring operations.

U.S. Pat. No. 7,798,067 to Starnes discloses a thin turntable having bearings disposed between a ground-engaging member and a load-supporting platform. A motor support box is located below the ground engaging member, the motor support box housing the motor assembly. An intermediate load transfer unit having bearing elements is located between the ground-engaging member and the load-supporting platform. The ground engaging unit of Starnes does not contain the entire turntable. The ground-engaging member has load surfaces that interact with the bearings of the intermediate load transfer unit.

U.S. Patent Application Publication No. 2007/0175353 A1 to Jeffs discloses a vehicle turntable with a housing having rollers within the housing. The housing rollers contact and support the turntable member. The vehicle turntable is pre-assembled with the housing, and the housing is an integral part of the turntable's ability to turn. A module adapted to receive completed machinery is not disclosed.

U.S. Pat. No. 7,966,939 to Holt discloses a foundation having a circular trench with an inner ring and an outer ring mounted within the circular trench. The two rings have rollers affixed thereon, and a bar assembly rests on the rollers. The turntable is assembled onto the foundation after the foundation is poured. A module adapted to receive completed machinery is not disclosed.

There is a need for improved lifting and positioning machinery that overcomes the disadvantages of the prior art. Much of the prior art is directed towards avoiding the use of a foundation for machinery such as a turntable. Although avoiding the use of a foundation for some applications may be acceptable, a foundation is often necessary for heavy loads, because the machinery must be stiff enough to support the heavy load. This avoidance of foundations in the prior art shows a need for machinery, such as a turntable, having an improved installation method.

It is therefore desirable to provide a method of installation for the improved machinery that reduces or eliminates the need for modifications to a foundation after the foundation material is cured or set.

It is further desirable to provide an improved method of installation for machinery that is more cost effective and takes less time.

It is further desirable to provide a method of installation for a turntable that allows a foundation to be built with tighter tolerances than prior art methods.

SUMMARY OF THE INVENTION

An object of the present invention is to provide machinery having an installation module, the installation module receiving completed machinery.

Another object of the present invention is to provide a method of installation for machinery that reduces the need for modifications to a cured foundation in order to install the machinery.

Another object of the present invention is to provide an installation module that reduces the need to build foundation forms.

Another object of the present invention is to provide an installation module that is built with the tolerance requirements of the turntable.

Another object of the present invention is to provide an installation module for machinery that may be assembled on site.

Yet another object of the present invention is to provide an installation module that may have foundation material poured around the installation module so that tolerances of the foundation are tight enough to receive machinery without modification to the foundation or the machinery.

DETAILED DESCRIPTION OF THE INVENTION

The foundation receiver of the invention may be designed to receive a turntable or other machinery. The use of a receiver in the installation process allows for improved tolerances. By improving the tolerances of the foundation, the machinery installation can be accomplished quicker and in a more efficient manner. The figures show a foundation receiver that is round and designed for a turntable, however other shapes such as square and rectangular foundations may be necessary depending on the application, machinery to be installed and location or site conditions. For example, machinery such as rail car lifting and repair stands may have a generally rectangular foot print, and a foundation receiver may be designed to accommodate such machinery. Furthermore, a rectangular foot print may have a number of levels for housing different portions of the machinery or repair/lifting stand and a number of embedments. Features such as embedments and multiple levels lead to increased complexity of the foundation. By using a receiver that encompasses the embedments or features required by the machinery, surveying and installation time is significantly reduced and at the same time tolerances are tighter.

Figure 1:
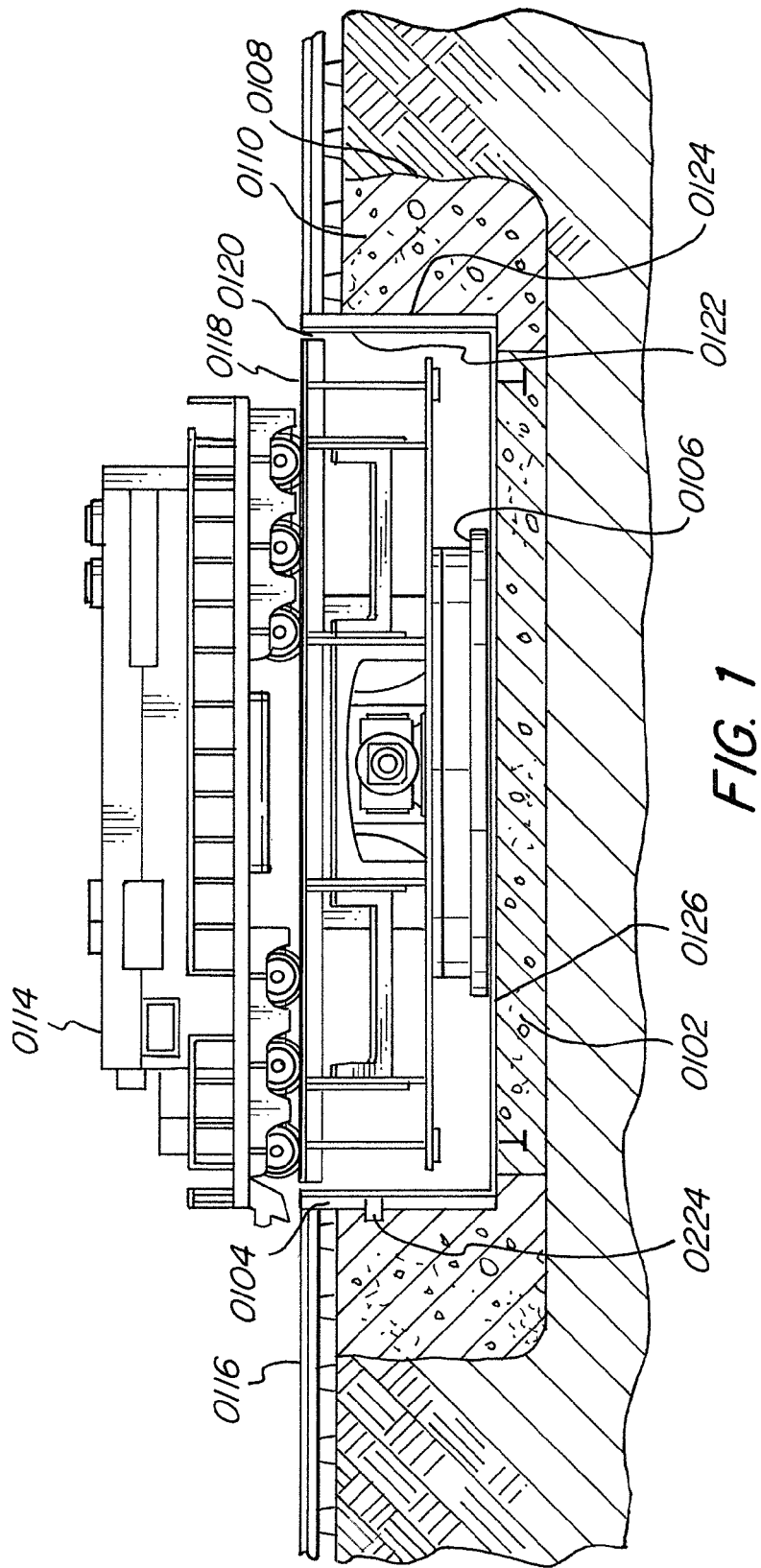
FIG. 1 is sectional side view of an installed turntable.

FIG. 1 shows a railroad turntable installed using a foundation receiver. A foundation receiver 0104 is placed within a hole 0108. The hole may have reinforcement bar ("re-bar") already laid within the hole, and the receiver may optionally be welded to the re-bar. A first pour 0102 of foundation material is poured underneath the foundation receiver 0104 and contacts the outside surface of the floor 0126 of the receiver, to create the horizontal portion of the foundation. A second pour 0110 of foundation material is done within the hole 0108 to create the vertical and cylindrical shaped section of the foundation that comes into contact with the outside surface of the wall 0124 of the receiver. The second pour 0110 contacts the receiver 0104 and the first pour 0102. A turntable is attached to the foundation receiver at the hub 0106. Main track 0116 is installed over the second pour 0110. If the main track 0116 is to be recessed in a floor or the ground, the main track 0116 inserts into cutouts (not shown) in the receiver 0104. The cutouts (not shown) in the receiver allow the main track 0116 to be recessed in the floor and installed flush with the inner wall 0122 of the receiver. With the main track 0116 flush to the inner wall 0122 of the receiver, the turntable can be installed with an appropriate gap 0120 between the main track 0116 and the turntable track 0118. The installation with the appropriate gap may be accomplished without modifications to the previously poured foundations 0102 and 0110, because the foundation receiver 0104 is already designed with the correct tolerances between the main track 0116 and the turntable track 0118. When installed, a rail engine 0114 or other rail vehicle may drive onto the turntable, allowing the engine to be rotated as necessary. FIG. 1 shows only one track from left to right, however a multiple track layout is contemplated. The foundation receiver can be designed with multiple cutouts (not shown) that are positioned to allow multiple main tracks to converge at one turntable. For example, a multiple main track layout may have a track that would extend in the direction out of the page in addition to the track shown in the FIG. 1.

Figure 2:
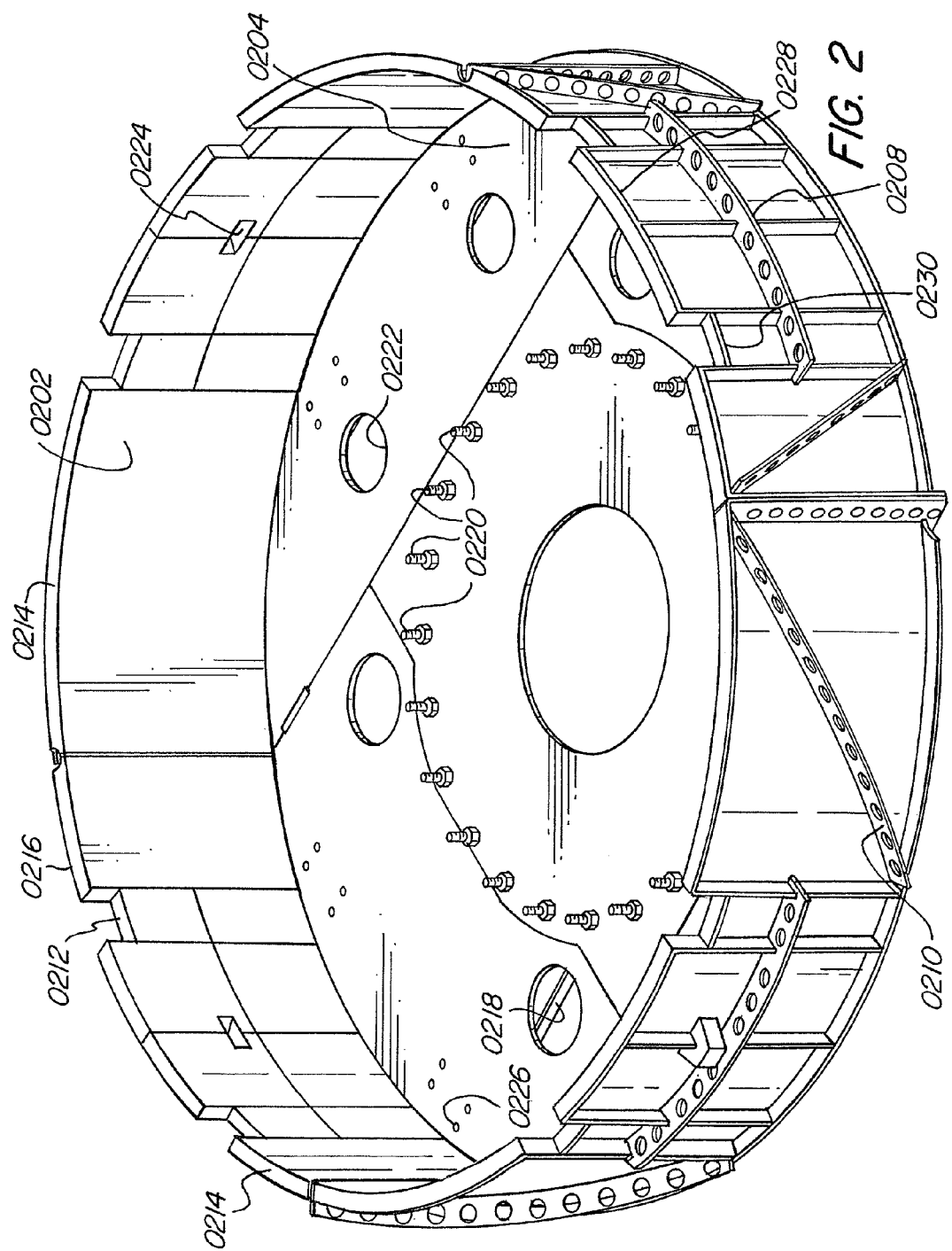
FIG. 2 is a perspective view of the installation module shown in FIG. 1.

FIG. 2 shows an assembled foundation receiver. The receiver has sides 0202 and a floor 0204. A pattern of bolts 0220 pass through holes in the receiver. Depending on the size of the receiver and the transportation constraints, the receiver may be assembled from multiple pieces. FIG. 2 shows a receiver assembled from a center section 0216 and two side sections 0214. The receiver has cutouts 0212 for a main track (not shown) to travel through. When installed, the main track is installed to sit on top of the receiver cutouts 0212 with the appropriate gap between the main and turntable tracks (not shown). Spacing of the cutouts 0212 can determine the minimum turn angle of a rail car using the turntable. As shown in FIG. 2, the minimum turn angle is 90 degrees, however other angles are possible depending on the needs and design of the turntable and receiver module. The receiver is installed on a first flat foundation (not shown) and bolts 0220 from the foundation extend through the receiver. The receiver has horizontal anchor flanges 0208 and angled anchor flanges 0210 which are submerged or surrounded by foundation material when the second foundation section is poured as shown in FIG. 1. Anchor flanges 0208 and 0210 may additionally act as supports for the walls 0202 of the foundation receiver. Beams or flanges 0218 may be affixed with a weld 0226 to the bottom of the receiver to provide added stiffness or to engage the foundation poured beneath the receiver. Optional pour holes 0222 allow for foundation material to be poured into any gaps between the foundation and the receiver during installation. In the case where the receiver does not have pour holes 0222, foundation material is poured within the hole at the installation site before the receiver 0104 is placed within the hole. Recesses 0224 in the receiver allow a locking mechanism from the turntable to engage the receiver and foundation to prevent the turntable from rotating. The horizontal anchor flange 0208 may be located close to the recess 0224 to provide for reinforcement of the foundation around the recess area, increasing the durability of the foundation immediately surrounding the recess 0224. When the receiver is installed in a foundation, the lip 0228 is substantially flush with the ground or shop floor level. Track in the ground or shop floor may enter the receiver through the cutout 0212 and the track may be recessed in the ground or shop floor with the cutout lip 0230 substantially flush with the recess in the ground or shop floor.

Figure 3:
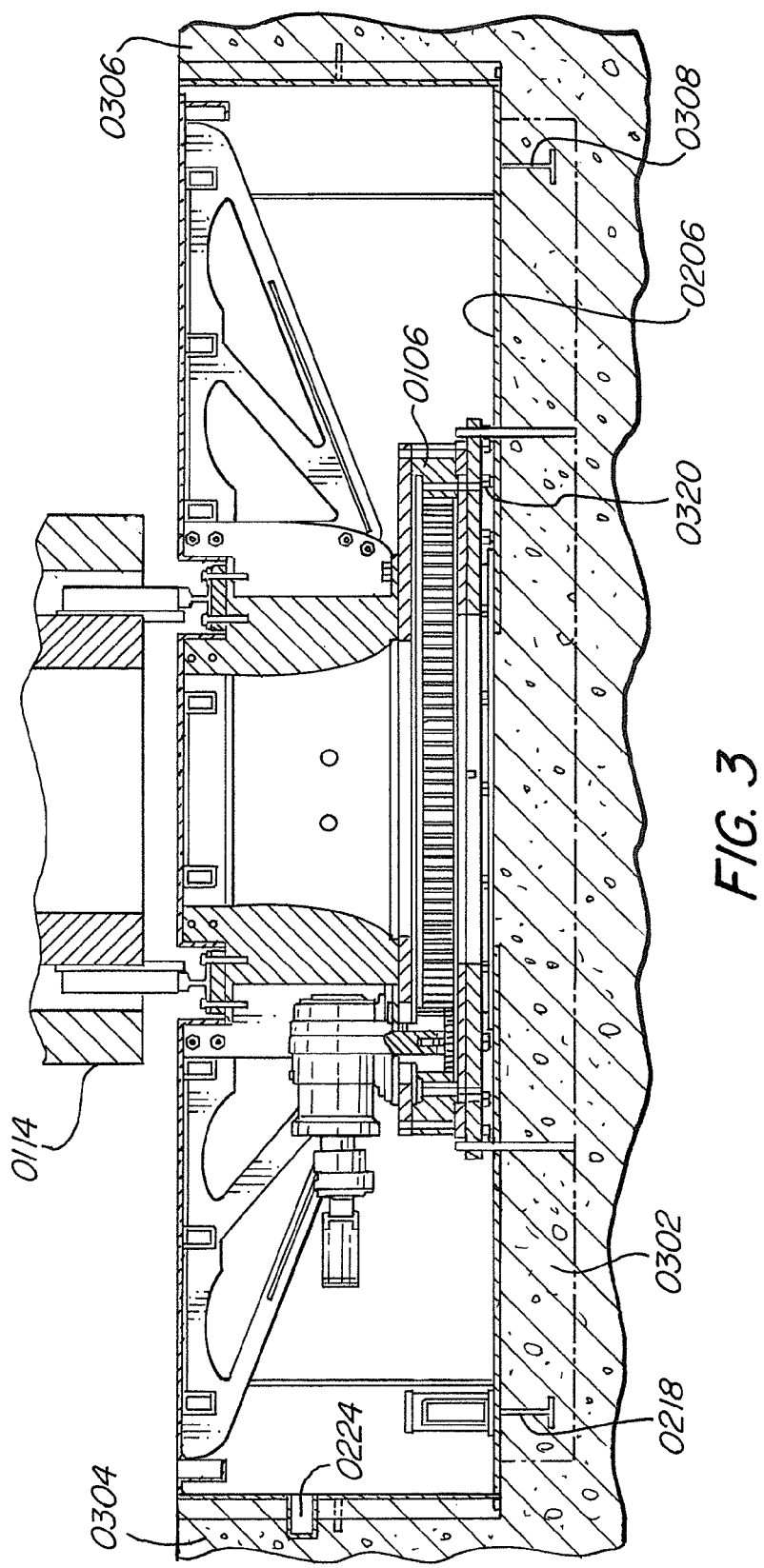
FIG. 3 is a sectional side view of the installation module of FIG. 2, installed on site.

FIG. 3 shows a sectional side view of a foundation receiver installed on site. A first pour 0302 is made in a hole that is below ground level 0306, for example, below the level of a shop floor. Beams 0218 are submerged in the foundation material of the first pour 0302. Bolts extend through the floor 0206 of the receiver and attach to the hub 0106 of the turntable. Nuts 0320 secure and level the receiver. Beams 0308 are affixed to the bottom of the receiver. The beams 0218 are buried in the bottom of the foundation 0302, which helps secure the receiver to the foundation. A second pour 0304 is poured around the outside of the walls of the receiver. Lock pockets 0224 are embedded in the second pour 0304 so that the turntable may engage with the lock pocket 0224 to prevent rotation of the turntable while a rail car enters or exits the turntable.

Figure 4:
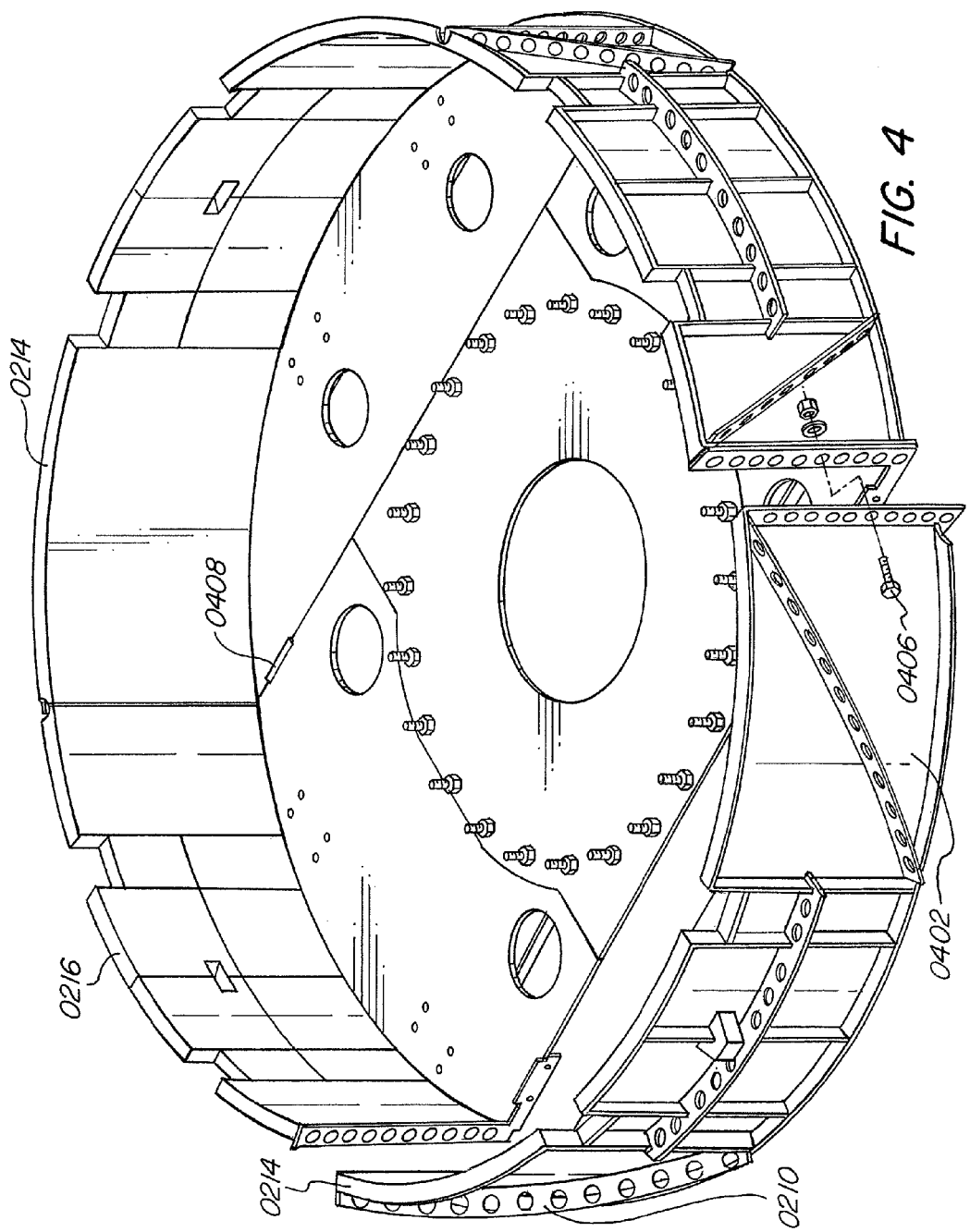
FIG. 4 is an exploded view of the installation module shown in FIG. 3.

FIG. 4 shows an exploded view of a foundation receiver that is made from a number of receiver sections. Side sections 0214 are joined to center section 0216 using nut and bolts 0406 and weld 0408. Angular flanges 0210 are located around the outside of the receiver, and when the second foundation pour is poured around the receiver, the angular flanges 0210 are submerged and secure the receiver to the foundation. The angular flanges 0210 also provide support to the walls 0402 of the foundation receiver. Although each section shown includes part of the receiver floor and walls, a receiver section may be made up of only floor or wall sections, and the sections may be assembled either on site or at a factory to create the completed receiver. Typically, a receiver for a larger turntable will be assembled from multiple sections at the installation site, because the completed receiver would be too large to transport.

Figure 5:
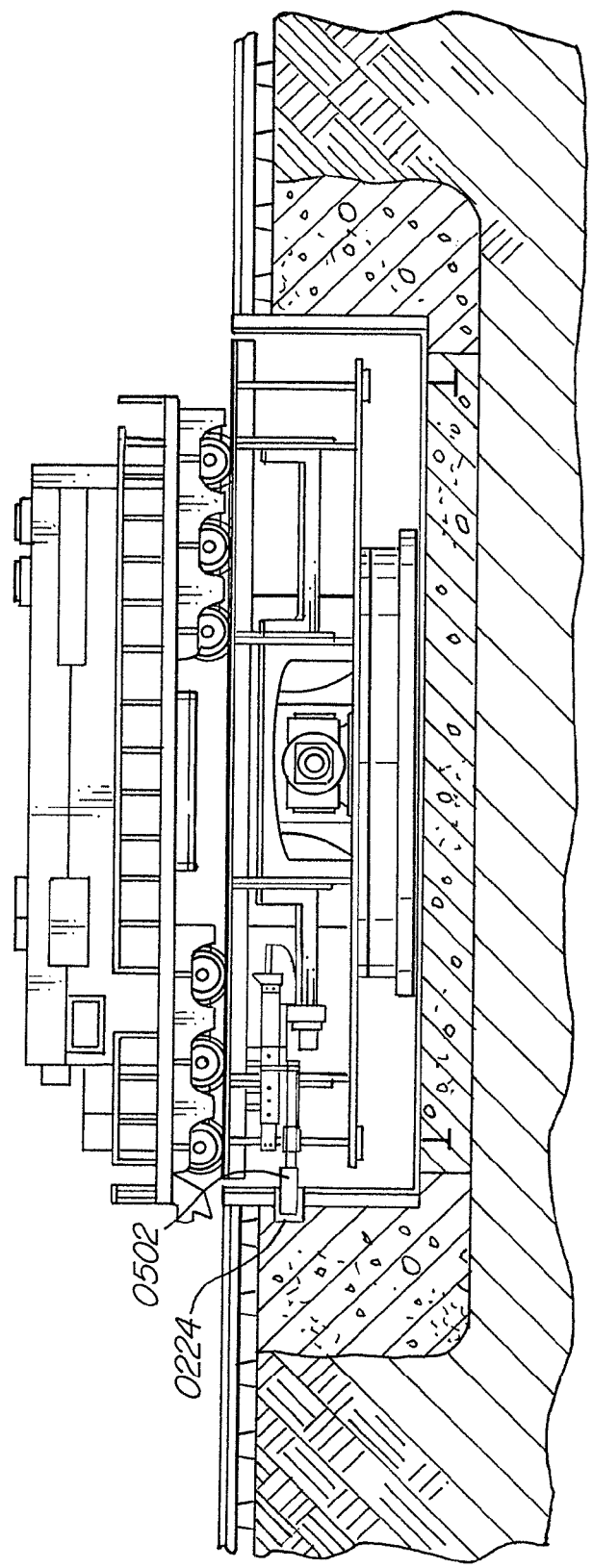
FIG. 5 is a sectional side view of another embodiment of the turntable and installation module shown in FIG. 1.

FIG. 5 shows a side view of a turntable installed in a foundation receiver. The turntable has a locking mechanism 0502 installed thereon. The locking mechanism 0502 selectively engages with the recess 0224 of the receiver to prevent rotation of the turntable.

The improved turntable with foundation receiver as described above eliminates the need to provide a number of embedments to a general contractor, the embedments acting as forms for the complicated portions of the foundation. Formerly, each embedment would need to be located relative to the center of the foundation. Since the complicated portions of the foundation are already built into the receiver, there is no need to locate individual embedments relative to center. Further, because the parts making up the receiver are cut on computer controlled machines, the tolerances for the receiver are substantially better than those of a contractor's concrete form. Because the center is already located, there is no need for surveying to find center, which saves a substantial amount of installation time.

Recesses or lock pockets are used to fix the turntable in place when a rail car is entering or exiting the turntable. These lock pockets must be precisely set relative to each other and at the same elevation so that the locking mechanism will engage correctly with the lock pocket. Formerly, the lock pockets were each built into an embedment for the foundation, and each embedment was individually located relative to center within the foundation mold. With the improved turntable with receiver and installation method thereof, all required lock pockets are located correctly relative to center, and at the same height, without any need for a contractor to measure and set embedments relative to center. This provides a significant cost and time savings during the installation process. The contractor is only required to make sure that the main rails and the turntable rails are parallel and at the same height.

Further installation savings include the reduction in total number of pours. Often, the current installation method uses three separate pours. The first for the base and the second for most of the side. The final portion of the side is often not poured until the turntable is installed. The installation of the turntable can take a week or longer with current methods. Once the turntable is installed, the final pour is done to create the curb around the top edge of the foundation. Since the third pour is done a week or more after the second pour, a concrete contractor must re-mobilize its concrete trucks and workers for the final pour. The re-mobilization is a significant expense to the installation. The new turntable and installation method eliminates the need for the re-mobilization of concrete trucks by providing a significant time and cost savings.

Although the invention has been described with reference to a particular arrangement of parts, features and the like, these are not intended to exhaust all possible arrangements or features, and indeed many modifications and variations will be ascertainable to those of skill in the art.

What is claimed is:

1. A device for installing a turntable in a foundation comprising:
   a receiver adapted to be installed in the foundation, said receiver having a floor and walls defining an opening, said floor and walls each having an outside surface;
   said floor having holes therein adapted to receive bolts passing through the holes and into the foundation wherein the bolts are adapted to affix to the turntable;
   said opening adapted to receive the turntable;
   said outside surface adapted to be affixed to the foundation.

2. The device of claim 1 wherein said receiver comprises a plurality of sections, said sections assembled to create the receiver.

3. The device of claim 1 further comprising:
   a flange affixed to said outside surface of said floor, said flange adapted to be submerged within, the foundation to affix said receiver to said foundation.

4. The device of claim 1 wherein:
   said turntable has a lock mechanism;
   said walls have at least one recess;
   said lock mechanism selectively engaging said receiver at said recess, and said engaging limiting rotation of said turntable.

5. The device of claim 1 further comprising of:
   anchor flanges affixed to the outside surface of said walls, said anchor flanges adapted to be embedded in the foundation for affixing said receiver to said foundation.

6. The device of claim 5 wherein said anchor flanges are disposed in a horizontal orientation.

7. The device of claim 5 wherein said anchor flanges are disposed in an angular orientation.

8. The device of claim 5 wherein said anchor flanges are disposed in a vertical orientation.

9. The device of claim 6 wherein said anchor flanges reinforce the foundation at least one said recess.

10. The device of claim 1 wherein said floor has pour holes therein, said pour holes adapted to receive foundation material.

11. A turntable assembly comprising:
    a turntable;
    a foundation;
    a receiver having floor and walls defining an opening, said floor and walls each having an outside surface;
    said opening adapted to receive the turntable;
    said outside surface adapted to be affixed to the foundation;
    said floor having holes therein adapted to receive bolts, the bolts passing through the holes and into the foundation and for affixing the turntable to the foundation via said receiver wherein said foundation comprises;
    a first pour contacting an outside surface of said floor; and
    a second pour contacting an outside surface of said walls.

12. The device of claim 11 wherein said receiver comprises a plurality of sections, said sections assembled to create the receiver.

13. The device of claim 11 wherein:
    said turntable has a lock mechanism;
    said walls have at least one recess;

said lock mechanism selectively engaging said receiver at said recess, and said engaging limiting rotation of said turntable.

14. The device of claim 11 further comprising:
a hub attached to said turntable;
anchor bolts affixed to the foundation through holes in said floor; and
said hub affixed to said anchor bolts.

15. The device of claim 11 further comprising:
anchor flanges affixed to the outside surface of said walls, said anchor flanges adapted to be embedded in a foundation for affixing said receiver to said foundation.

16. The device of claim 11 wherein said floor has pour holes therein, the pour holes adapted to receive foundation material.

17. A method of installing a turntable at a site said method comprising the steps of:
providing a turntable;
providing a receiver having a floor and walls, said floor and walls defining an opening, said floor having a holes adapted to receive bolts;
providing a hole at the site, said hole large enough to receive the receiver;
placing said receiver within said hole at the site;
pouring a foundation around said receiver such that at least part of said receiver is embedded in the foundation; and
affixing said turntable within said receiver with bolts passing though said holes in said floor.

18. The method of claim 17 wherein said pouring step comprises the steps of:
pouring a first section of the foundation beneath said floor; and
pouring a second section of the foundation around the walls, said first and second sections defining said foundation.

19. The method of claim 17 wherein said placing step includes the step of affixing said receiver module to reinforcement bar, said reinforcement bar located within said hole.

20. The method of claim 17 wherein said pouring step comprises the step of pouring foundation material through pour holes in the floor of the receiver.

* * * * *